US006913856B2

(12) United States Patent
Nirasawa et al.

(10) Patent No.: US 6,913,856 B2
(45) Date of Patent: Jul. 5, 2005

(54) NONAQUEOUS ELECTROLYTE SECONDARY BATTERY

(75) Inventors: Takao Nirasawa, Fukushima (JP); Hidetoshi Ito, Miyagi (JP); Atsuo Omaru, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/837,847

(22) Filed: Apr. 18, 2001

(65) Prior Publication Data

US 2002/0018940 A1 Feb. 14, 2002

(30) Foreign Application Priority Data

Apr. 18, 2000 (JP) ..................................... P2000-122417
Oct. 31, 2000 (JP) ..................................... P2000-333571

(51) Int. Cl.[7] ............................................ H01M 10/40
(52) U.S. Cl. .................... 429/314; 429/340; 429/231.4; 429/231.95
(58) Field of Search .............................. 429/94, 231.4, 429/231.95, 303, 314, 316, 317, 336, 340

(56) References Cited

U.S. PATENT DOCUMENTS 4,489,145 A    12/1984   Abraham 6,413,677 B1 * 7/2002 Hamamoto et al. ......... 429/326

FOREIGN PATENT DOCUMENTS

| EP | 713258 A1 | * | 5/1996 | .......... H01M/10/40 |
| EP | 0 759 641 | | 2/1997 | |
| JP | 61161673 | | 7/1986 | |
| JP | 09180757 A | * | 7/1997 | .......... H01M/10/40 |

OTHER PUBLICATIONS

Linden "Handbook of Batteries", 1995, McGraw–Hill, Inc., pp. 14.49–14.50 and 36.29.*

* cited by examiner

Primary Examiner—Gregg Cantelmo
(74) Attorney, Agent, or Firm—Sonnenschein, Nath & Rosenthal LLP

(57) ABSTRACT

A nonaqueous electrolyte secondary battery includes a positive electrode having a positive electrode active material, a negative electrode containing a negative electrode active material capable of being doped/undoped with lithium, and a nonaqueous electrolyte. The nonaqueous electrolyte contains at least one of thiols, thiophenes, thioanisoles, thiazoles, thioacetates, aromatic sulfones, and the derivatives thereof. The capacity of the battery is not significantly degraded after cycling and its cycle life is significantly long.

8 Claims, 1 Drawing Sheet

FIGURE
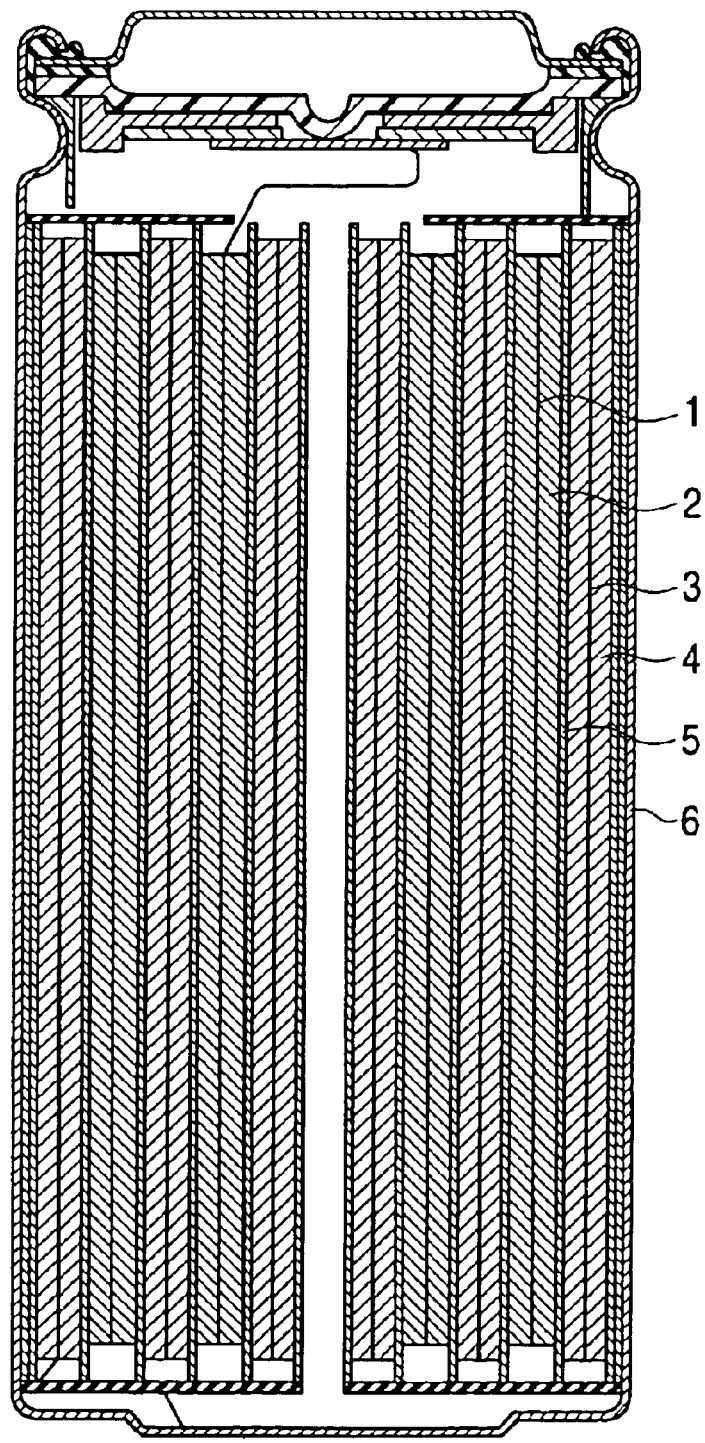

NONAQUEOUS ELECTROLYTE SECONDARY BATTERY

RELATED APPLICATION DATA

The present application claims priority to Japanese Applications Nos. P2000-122417 filed Apr. 18, 2000 and P2000-333571 filed Oct. 31, 2000, which application is incorporated herein by reference to the extent permitted by law.

BACKGROUND OF THE INVENTION

The present invention relates to a nonaqueous electrolyte battery comprising a positive electrode having a positive electrode active material, a negative electrode containing a negative electrode active material capable of being doped/undoped with lithium, and a nonaqueous electrolyte.

Progress in electronic technology has led to the development of various types of small and portable high-performance electronic devices. Accordingly, batteries for operating these electronic devices are required to be lightweight and of high-capacity, and energy density thereof needs to be further improved.

As the batteries for driving these electronic devices, secondary batteries such as nickel-cadmium batteries, lead batteries, and so forth have been conventionally used. However, these batteries have a low discharge potential and fail to obtain a desired energy density.

Presently, research and development on the nonaqueous electrolyte secondary battery having a negative electrode composed of lithium or a lithium alloy is being conducted widely.

This type of battery has a high energy density and a low self-discharge, and is light-weight because a lithium containing composite oxide having a high discharge voltage, typically $LiCoO_2$, is used as the material of the positive electrode. However, when the nonaqueous electrolyte secondary battery has a negative electrode composed of lithium or a lithium alloy, lithium dendrite grows and reaches the positive electrode during repeated charge/discharge cycles, causing short-circuits inside the battery. Moreover, when quick a charge/discharge is performed as in the case of actual use, dendrite is generated inside the battery, making the battery unusable.

Consequently, a nonaqueous electrolyte battery using a negative electrode active material which is capable of occluding lithium ions in an intercalation compound, such as a metal oxide or carbon, and which is capable of being doped/undoped with lithium without depositing lithium on the negative electrode, i.e., a so-called lithium-ion battery, has drawn wide attention. In this lithium-ion secondary battery, lithium dendrite does not precipitate, even when the charge/discharge cycle is repeated, and superior charge/discharge cycle characteristics can be obtained.

Because of these advantages, lithium-ion secondary batteries have come to be used in various fields as the power sources of various electronic devices, especially portable devices.

Among portable electronic devices, cellular phones, for example, are used repetitively and perpetually consume electricity. Consequently, the secondary batteries used as the power sources of these portable electronic devices undergo a frequent charge and discharge.

When the lithium-ion secondary battery is frequently charged and discharged, the battery capacity thereof is degraded due to the irreversible reactions occurring between the negative electrode and the nonaqueous electrolyte. As a result, the lithium-ion secondary battery suffers from a short cycle life.

SUMMARY OF THE INVENTION

Accordingly, it is an object of the present invention to provide a nonaqueous electrolyte battery in which the capacity after cycling is significantly improved, thereby achieving a longer cycle life.

In order to achieve the above object, the nonaqueous electrolyte battery according to one aspect of the present invention includes a positive electrode having a positive electrode active material, a negative electrode containing a negative electrode active material capable of being doped/undoped with lithium, and a nonaqueous electrolyte. The nonaqueous electrolyte contains at least one of thiols, thiophenes, thioanisoles, thiazoles, thioacetates, aromatic sulfones, and the derivatives thereof.

Because a film composed of the above-described organic compound contained in the nonaqueous electrolyte is formed on the surfaces of the negative electrode of the secondary battery, irreversible reactions between the negative electrode and the nonaqueous electrolyte are prevented in the nonaqueous electrolyte battery of the present invention.

BRIEF DESCRIPTION OF THE DRAWINGS

FIG. 1 is a cross-sectional view of a nonaqueous electrolyte secondary battery according to an aspect of the present invention.

DESCRIPTION OF THE PREFERRED EMBODIMENTS

The preferred embodiments of the present invention will be described in detail below.

A nonaqueous electrolyte secondary battery of the present invention is applied to what is known as a lithium-ion secondary battery. The lithium-ion secondary battery comprises a positive electrode, a negative electrode, and a nonaqueous electrolyte.

FIG. 1 illustrates an exemplary structure of a nonaqueous electrolyte secondary battery according to the present invention. The battery is of a cylindrical shape and is formed by stacking a sheet-shaped positive electrode 2, a sheet-shaped negative electrode 4, and a separator 5 provided therebetween, rolling or spirally winding the stack in a longitudinal direction, placing the rolled electrodes into a battery case 6, and filling the battery case 6 with a nonaqueous electrolyte. The positive electrode 2 is prepared by forming positive electrode active material layers containing a positive electrode active material on the surfaces of a positive electrode collector 1. The negative electrode 4 is prepared by forming negative electrode active material layers containing a negative electrode active material on the surfaces of a negative electrode collector 3.

The nonaqueous electrolyte contains at least one of thiols, thiophenes, thioanisoles, thiazoles, thioacetates, aromatic sulfones, and the derivatives thereof.

Examples of the thiols are aliphatic thiols such as methanethiol and ethanethiol; aromatic thiols such as thiophenol, 4-fluorothiophenol, 2-chlorothiophenol, 4-t-butylthiophenol, and 4-t-butyl-1,2-benzenethiol; and derivatives thereof.

Examples of the thiophenes are thiophene, 2-acetylthiophene, 3-acetylthiophene, 2,5- diacetylthiophene, 2-thiophenecarbonylchloride, 2-methoxycarbonylthiophene, 2,5-bismethoxycarbonylthiophene, and the derivatives thereof.

Examples of the thioanisoles are thioanisole, 4-methylthiobenzonitrile, 4-methylthioacetophenone, 2-methlthiobenzaldehyde, 2-chlorothioanisole, 4-bromothioanisole, and the derivatives thereof.

Examples of the thiazoles are thiazole, 1,2-benzisothiazole and derivatives thereof.

Examples of the thioacetates are methyl thioacetate, ethyl thioacetate, phenyl thioacetate, methyl fluoromethylthioacetate, methyl difluoromethylthioacetate, ethyl difluoromethylthioacetate, and the derivatives thereof.

Examples of the aromatic sulfones are methyl phenyl sulfone, 4-methylsulfonylacetophenone, tribromomethylphenylsulfone, and their derivatives.

During a charge/discharge, a film composed of the above-described organic compound contained in the nonaqueous electrolyte is formed on the surfaces of the negative electrode of the nonaqueous electrolyte battery.

This film prevents the irreversible reactions between the negative electrode and the nonaqueous electrolyte and reduces the capacity degradation which would otherwise occur when a charge/discharge is performed repetitively.

The content of at least one of thiols, thiophenes, thioanisoles, thiazoles, thioacetates, aromatic sulfones, and the derivatives thereof is preferably in the range of 0.03 percent by weight to 10 percent by weight of the entire nonaqueous electrolyte and, more preferably, in the range of 0.05 percent by weight to 10 percent by weight.

When the content of the above-described organic compound is less than 0.03 percent by weight, the resulting film may not have a desired thickness. In contrast, when the content of the above-described organic compound exceeds 10 percent by weight, the film formed on the surfaces of the negative electrode may be excessively thick and may prevent lithium doping/undoping at the negative electrode.

By setting the content of at least one of thiols, thiophenes, thioanisoles, thiazoles, thioacetates, aromatic sulfones, and the derivatives thereof in the range of 0.05 percent by weight to 10 percent by weight, the irreversible reactions between the negative electrode and the nonaqueous electrolyte can be effectively prevented.

The negative electrode is prepared by forming negative electrode active material layers containing a negative electrode active material on a negative electrode collector. The negative electrode collector is composed of, for example, nickel foil.

As the negative electrode active materials, materials capable of being doped/undoped with lithium, i.e., carbonaceous materials, crystallized or amorphous metal oxides, etc., are used. Examples of the carbonaceous materials are graphitizable carbonaceous materials, nongraphitizable carbonaceous materials, and graphite materials.

As the negative electrode active material, a carbonaceous material may be used. Alternatively, at least one material capable of being doped/undoped with lithium, such as a metal capable of alloying with lithium or an alloy compound of such a metal may be used.

The alloy compound is a compound represented by the formula $M_xM'_yLi_z$ (wherein M' is at least one of the metal elements other than Li and M, the value of x is greater than zero, and the values of y and z are greater than or equal to zero, respectively). In this invention, semiconductive elements such as Bi, Si, and As are included in the metal elements.

Examples of the metals which alloy with lithium are metals such as Mg, B, Al, Ga, In, Si, Ge, Sn, Pb, Sb, Bi, Cd, Ag, Zn, Hf, and Y. Examples of the alloy compounds are alloy compounds containing the above-described metal elements, for example, Li—Al, Li—Al—M (wherein M is at least one of Groups 2A, 3B, and 4B transition metals), AlSb, and CuMgSb.

Among the above-described elements, it is preferable to use a Group 3B normal element, elemental Si, elemental Sn, or alloys thereof. The alloys of Si and Sn are especially preferable. As the Si or Sn alloy, a compound described as $M_xSi$ or $M_xSn$, wherein M is at least one metal element other than Si or Sn, is used. More specifically, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, or the like is used.

Moreover, Group 4B elements other than carbon, including at least one nonmetallic element may be used as the negative electrode active material. In this material, at least one of the Group 4B elements may be included. Furthermore, a metal element not of Group 4B, particularly lithium, may be included. Examples are SiC, $Si_3N_4$, $Si_2N_2O$, $Ge_2N_2O$, $SiO_x$ (wherein $0<x\leq2$), LiSiO, and LiSnO.

Group 4B elements other than carbon and including at least one nonmetallic element are required to be able to electrochemically intercalate and deintercalate lithium. The charge/discharge capacity is preferably 400 mAh/cm$^3$ or more, and more preferably 500 mAh/cm$^3$ or more. In calculating the charge/discharge capacity per unit volume, the true specific gravity of the above-described compound is used.

The method for preparing the above-described metal capable of forming an alloy with lithium and the alloy compound of such a metal is not limited. A mechanical alloying process, a process of thermally treating mixed material compounds in an inert atmosphere or a reducing atmosphere, or the like may be employed.

Intercalation of lithium into the negative electrode active material comprising a metal capable of forming an alloy with lithium or an alloy compound of such a metal may occur electrochemically inside the battery after the battery is formed; alternatively, lithium may be supplied from the positive electrode 2 or a source other than the positive electrode 2 to be electrochemically intercalated during and after the battery is made. Moreover, the raw material may be formed as a lithium-containing material so as to form the negative electrode 4 containing lithium when the battery is made.

When a metal capable of forming an alloy with lithium or an alloy compound of such a metal is used as the negative electrode active material, the metal or the alloy may or may not be pulverized.

When a metal capable of forming an alloy with lithium and an alloy compound of such a metal are to be pulverized, they only need to be pulverized to an extent that the maximum particle diameter thereof is less than a predetermined thickness of the negative electrode active material layer. There is no limit as to the method of pulverization. Typically, ball-milling or jet-milling is employed. The negative electrode active material comprising the metal capable of forming an alloy with lithium and the alloy compound of such a metal is preferably pulverized to an average particle diameter (volume mean particle diameter) of 50 $\mu$m or less and, more preferably, 20 $\mu$m or less.

When a metal capable of forming an alloy with lithium and an alloy compound of such a metal are not to be pulverized, the negative electrode active material layer is formed as a solid by a chemical vapor deposition process, a sputtering process, a hot pressing, or the like.

When a carbonaceous material is used as the negative electrode active material, such as a nongraphitizable carbonaceous material, carbonized materials obtained by baking a furan resin made of homopolymers/copolymers of furfuryl alcohol/furfural and copolymers of furfuryl alcohol/furfural with other resins may be used. The nongraphitizable carbonaceous material preferably has a (002) interplanar distance of 0.37 nm or more, a true density of less than 1.70 g/cm$^3$, and an exothermic peak of less than 700° C. in a differential thermal analysis (DTA), as its physical parameters. The nongraphitizable carbonaceous material which complies with the above physical parameters will make a negative electrode active material having a large capacity.

In preparing the nongraphitizable carbonaceous material, phenol resin, acrylic resin, vinyl halide resin, polyimide resin, polyamide-imide resin, polyamide resin, conjugated resin such as polyacetylene or poly(p-phenylene), cellulose and its derivative, or any polymeric organic compound may be used as the starting organic material.

As in the case with the above-described furan resin, the material prepared by introducing a functional group including oxygen into a petroleum pitch having a specific H/C atomic ratio so as to form an oxygen crosslink, does not melt during the process of carobonization at a temperature of 400° C. or more and makes the nongraphitizable carbonaceous material into its final solid-state.

The petroleum pitch is prepared by chemical polycondensation, extraction, thermal polycondensation, distillation (for example, vacuum distillation, atmospheric distillation, steam distillation), or the like, of coal tar, tars obtained by the high-temperature decomposition of ethylene bottom oil, petroleum, or the like, or asphalt. The H/C atomic ratio in the petroleum pitch is important and is required to be in the range of 0.6 to 0.8 in order to make nongraphitizable carbon.

As the method for introducing a functional group including oxygen into the petroleum pitch, there are, a wet process using an aqueous solution of nitric acid, the mixed acid, sulfuric acid, hypochlorous acid, or the like, a dry process using an oxidizing gas (for example, oxygen), and a method utilizing reactions due to a solid reagent such as sulfur, ammonium nitrate, ammonium persulfate, ferric chloride, or the like. The oxygen content in the petroleum pitch is not limited; however, as disclosed in Japanese Laid-Open Patent Application Publication No. Hei 3-252053, the content is preferably 3% or more, and more preferably, 5% or more. By controlling the oxygen content to the above-described range, the resulting carbonaceous material has a crystal structure having the aforementioned physical parameters.

Moreover, the compound containing phosphorous, oxygen, and carbon as the main components disclosed in Japanese Laid-Open Patent Application Publication No. Hei 3-137010 exhibits the same physical parameters as the nongraphitizable carbonaceous material and can be used as the negative electrode active material.

Any other organic material can also be used as the starting material as long as the material can be made into a nongraphitizable carbon by an oxygen crosslinking and solid phase carbonization process. There is no limit as to the method of the oxygen crosslinking.

In preparing the nongraphitizable carbonaceous material, after the above-described organic material is carbonized at a temperature in the range of 300 to 700° C., the temperature is elevated at a rate of 1 to 100° C. per minute to a target temperature in the range of 900 to 1,300° C., and is maintained at the target temperature for 0 to 30 hours. The carbonization process may be omitted in some instances.

The resulting nongraphitizable carbonaceous material is pulverized and classified to form a negative electrode active material. The pulverization may be performed before or after carbonization, heat treatment, or high-temperature baking, or during the elevation of the temperature.

As the graphite material constituting the negative electrode active material, natural graphite or artificial graphite prepared by treating a carbonized organic material at high temperatures may be used.

The artificial graphite is prepared using an organic compound such as coal or pitch as the starting material. As the pitch, those obtained by distillation (for example, vacuum distillation, atmosphere distillation, and steam distillation), thermal polycondensation, extraction, and/or chemical polycondensation of coal tar, tars obtained by high-temperature decomposition of ethylene bottom oil, petroleum, or the like, may be used. The pitch formed by dry distillation of woods may also be used. As the starting material of the pitch, poly(vinyl chloride) resin, polyvinyl acetate, polyvinyl butyral, or 3,5-dimethylphenol resin may be used.

Moreover, as the starting material of the pitch, fused polycyclic hydrocarbon compounds such as naphthalene, phenanthrene, anthracene, triphenylene, pyrene, perylene, pentaphene, pentacene, etc., the derivatives thereof (for example, carboxylic acid, carboxylic acid anhydride, and carboxylic imide), the mixture thereof, condensed heterocyclics such as acenaphthylene, indole, isoindole, quinoline, isoquinoline, quinoxaline, phthalazine, carbazole, acridine, phenazine, phenanthridine, etc., and the derivatives thereof may also be used.

In preparing the artificial graphite, the above-described organic material is carbonized at a temperature in the range of 300 to 700° C. in an inert gas such as nitrogen, the temperature is then elevated at a rate of 1 to 100° C. per minute until a target temperature in the range of 900 to 1,500° C. is reached, and is maintained threat for 0 to 30 hours in order to perform a heat treatment (that subjected to the process up to this point is referred to as the graphitizable carbonaceous material). Next, thermal treatment is performed at a temperature of 2,000° C. or more, preferably, 2,500° C. or more. The process of carbonization and heat treatment may be omitted in some instances.

The resulting artificial graphite is pulverized and classified to make a negative electrode active material. The pulverization may be performed before or after carbonization or heat treatment, or during the elevation of the temperature. The thermal treatment for graphitization is performed in the pulverized state, ultimately.

The true density of the graphite material is preferably 2.1 g/cm$^3$ or more, and more preferably, 2.18 g/cm$^3$ or more. In order to achieve such a true density, a (002) interplanar distance determined by X-ray diffraction analysis is preferably less than 0.340 nm and, more preferably, in the range of 0.335 nm to 0.337 nm. The c-axis crystallite thickness is required to be 14.0 nm or more.

In order to overcome the degradation of the capacity during cycling and to achieve a longer cycle life of a battery, the bulk density, the average value of the shape parameter X (the average shape parameter $X_{ave}$), and specific surface area are important.

To be specific, the graphite material preferably has a bulk density, determined by the method described in Japanese Industrial Standard (JIS) K-1469, of 0.4 g/cm$^3$ or more, more preferably, 0.5 g/cm$^3$ or more, and most preferably 0.6 g/cm$^3$ or more. When the negative electrode 4 contains the graphite material having a bulk density of 0.4 g/cm$^3$ or more, the negative electrode material does not separate from the negative electrode active material layers, thus achieving an improved electrode configuration. Accordingly, the nonaqueous electrolyte battery having such a negative electrode has a longer cycle life.

Preferably, the graphite material having an average value of the shape parameter X, represented by the formula below, of 125 or less in addition to satisfying the above-described bulk density, is used in order to achieve a further increased cycle life.

$$X=(W/T) \times (L/T)$$

X: shape parameter

T: thickness of the thinnest portion of the particle

L: length of the particle in the longitudinal direction

W: length of the particle in a direction perpendicular to the longitudinal axis

The shape parameter of the graphite material particles having the shape of a flat cylinder or rectangle is the product X obtained by multiplying the value of L divided by T and the value of W divided by L, wherein T is the thickness of the thinnest portion of the particle, L is the length in the longitudinal direction, and W is the length in a direction perpendicular to the longitudinal axis. If the shape parameter X is smaller, the height relative to the area of the base is increased and the powder has a reduced flatness.

The negative electrode comprising the graphite material having the bulk density in the above-described range and the average shape parameter $X_{ave}$ of 125 or less has an excellent electrode configuration and achieves a longer cycle life.

The average shape parameter $X_{ave}$ is preferably in the range of 2 to 115, more particularly, in the range of 2 to 100.

The graphite material preferably has the bulk density and the average shape parameter $X_{ave}$ in the above-described ranges. Moreover, the graphite material preferably has a specific surface area, determined by a nitrogen-adsorption Brunauer-Emmett-Teller method, of 9 m$^2$/g or less, more preferably 7 m$^2$/g or less, and most preferably 5 m$^2$/g or less. It is considered that submicron particles adhering to the graphite particles are causing the bulk density to decrease. When the particles adhere, the specific surface area is increased. Accordingly, a higher bulk density is achieved if the graphite material having a smaller specific surface is used, even when the particle sizes are comparable. Thus, the nonaqueous electrolyte battery comprising the negative electrode 4 containing such a graphite material has improved cycle characteristics.

Preferably, in a particle size distribution determined by a laser diffraction analysis, the graphite material has a 10% cumulative particle diameter of 3 µm or more, a 50% cumulative particle diameter of 10 µm or more, and a 90% cumulative particle diameter of 70 µm or less. Initial failures of the nonaqueous electrolyte battery are significantly reduced when the 90% cumulative particle diameter is 60 µm or less.

When the particle size has a range of values, it becomes possible to efficiently fill the electrode with the graphite material. Preferably, the particle size distribution coincides with a normal distribution. When the distribution number of the particles having smaller diameters is increased, the exothermic temperature generated from an abnormal situation such as overcharge may be elevated. In contrast, when the distribution number of the particles having larger diameters is increased, failures such as short circuits may occur inside the battery at the time of initial charging. This is because when lithium is intercalated into the graphite layers constituting the negative electrode during charging, the size of crystallites of the graphite are expanded by approximately 10%, causing the negative electrode to press against the positive electrode 2 and the separator 5.

Accordingly, by using a graphite material having a well-balanced particle size distribution of small to large diameters, highly reliable batteries can be manufactured.

Preferably, the average fracture strength of the graphite particles is 6 kgf/mm$^2$ or more. Generally, in graphite materials having a high crystallinity, graphite hexagonal net faces are developed in the direction of the a axis and are stacked to make crystallites in the c axis. The bonds between the carbon hexagonal faces are yielded by van der Waals forces, are weak, and easily suffer from deformations due to stresses. Accordingly, when the graphite material is press-formed to make the electrode, the graphite material is more likely to suffer from fractures than a carbonaceous material formed by a low-temperature heat treatment, and it is difficult to secure open pores. Since the nonaqueous electrolyte is held in the open pores, an increase in the number of open pores results in an increase in the amount of the electrolyte. Thus, diffusion of ions in the electrode is smooth, improving the discharge characteristics.

Preferably, a pulverized and classified graphitized molded material formed by thermally treating and graphitizing a molded carbonaceous material is used as the negative electrode active material. The molded graphitized material has a higher bulk density and higher fracture strength compared to the above-described graphite material.

The molded graphitized material is formed by mixing coke, which is used as a filler, and binder pitch, which is used as a binder or sintering agent, so as to carbonize the binder pitch, impregnating the carbonized binder pitch with a pitch to perform carbonization, and further performing graphitization. Alternatively, the filler itself may be a material having bondability and sinterability. The same molded graphitized material can still be obtained.

When coke, which is used as a filler, and binder pitch are used, the resulting substance after the graphitization exhibits a polycrystalline structure. Furthermore, because elements such as sulfur and nitrogen contained therein are gasified and emitted during the thermal treatment, the passages thereof form micro pores. As a consequence, lithium doping/undoping at the negative electrode material is promoted. There is also a commercial advantage of high process efficiencies.

The graphitizable material is formed using the same starting materials as those of the above-described artificial graphite. During the carbonization, the coal and the pitch, existing as a liquid at a temperature of approximately 400° C. at the most, are kept at that temperature so that aromatic rings are condensed to be polycyclic and are aligned. Subsequently, when the temperature reaches 500° C. or more, a solid carbon-precursor, that is, semicoke, is formed. This process is a typical process for making graphitizable carbon and is called a liquid-phase carbonization process.

As the metal oxide, it is preferable to use an oxide containing a transition metal. Crystallized or amorphous compounds primarily containing iron oxide, ruthenium oxide, molybdenum oxide, tungsten oxide, titanium oxide, tin oxide, silicon oxide, or the like may be used as such an oxide. It is especially preferable to use a compound having a charge/discharge potential similar to that of metallic lithium.

The positive electrode is prepared by forming positive electrode active material layers containing a positive electrode active material on the surfaces of a positive electrode collector. The positive electrode collector is composed of, for example, an aluminum foil.

As the positive electrode active material, a lithium-based metal oxide, an intercalation compound containing lithium, or the like may be used. More specifically, it is preferable to use a composite oxide containing lithium and a transition metal represented by the general formula $LiM_xO_y$, wherein M includes at least one of Co, Ni, Mn, Fe, Al, V, and Ti).

The positive electrode in a charged state preferably contains lithium at an amount corresponding to the charge/discharge capacity of 250 mAh or more, more preferably 300 mAh or more, per gram of the negative electrode carbonaceous material after undergoing a charge/discharge cycle for approximately five times. Alternatively, lithium may be supplied from sources other than positive electrode, typically from the electrolyte. It is sufficient if there is lithium at an amount corresponding to a charge/discharge capacity of 250 mAh or more per gram of the negative electrode carbonaceous material in the entire battery system. It should be noted here that the amount of lithium is determined based on the discharge capacity of the nonaqueous electrolyte battery.

Although the present invention is described above in terms of the nonaqueous electrolyte battery using the liquid nonaqueous electrolyte, the scope of invention is not limited to this. A gel electrolyte prepared by gelifying the above-described nonaqueous electrolyte using gelatinizer, a solid polymer electrolyte prepared by dissolving or mixing an electrolyte salt into a polymer matrix, or a polymer gel electrolyte prepared by stabilizing the above-described nonaqueous electrolyte in a polymer matrix may be used in the nonaqueous electrolyte battery.

In the liquid electrolyte, the nonaqueous solvent contains a high-dielectric-coefficient solvent highly capable of dissolving an electrolyte salt as the main solvent and a low-viscosity solvent highly capable of transferring electrolyte ions as the additive.

Examples of the high-dielectric-coefficient solvents are propylene carbonate (hereinafter referred to as "PC"), ethylene carbonate (hereinafter referred to as "EC"), butylene carbonate (hereinafter referred to as "BC"), vinylene carbonate (hereinafter referred to as "VC"), sulfolanes, butyrolactones, and valerolactones. Examples of the low-viscosity solvents are symmetrical and asymmetrical chain carbonic esters such as diethyl carbonate, dimethyl carbonate (hereinafter referred to as "DMC"), methylethyl carbonate, and methylpropyl carbonate; carboxylate ester such as methyl propionate and ethyl propionate; and phosphoester such as trimethyl phosphate and triethyl phosphate. These nonaqueous solvents may be used alone or in combination.

It should be noted that when PC is used as the main solvent of the nonaqueous solvent in combination with graphite as the negative electrode active material, the PC may be decomposed by the graphite and, as a consequence, the capacity of the nonaqueous electrolyte battery may be degraded. Accordingly, when graphite is used as the negative electrode active material, the type of EC which withstands the decomposition by graphite or an EC compound in which at least one hydrogen atom is replaced with at least one halogen atom may be used as the main solvent of the nonaqueous solvent.

More preferably, a portion of the EC which withstands the decomposition by graphite or a compound with at least one halogen atom replacing at least one hydrogen atom may be replaced by a second component solvent. In this manner, the nonaqueous electrolyte battery exhibits further superior characteristics.

Examples of second component solvents are PC, BC, VC, 1,2-dimethoxyethane, 1,2-diethoxyethane, γ-butyrolactone, valerolactone, tetrahydrofuran, 2-methyltetrahydrofuran, 1,3-dioxolane, 4-methy-1,3-dioxolane, and sulfolane, methylsulfolane. It is especially preferable to use a carbonic ester based solvent such as PC, BC, VC, or the like at an amount of 40 percent by volume or less and more preferably 20 percent by volume or less.

There is no limit imposed as to the types of electrolyte salts as long as the electrolyte salt is a lithium salt exhibiting ion conductivity. Examples are $LiClO_4$, $LiAsF_6$, $LiPF_6$, $LiBF_4$, $LiB(C_6H_5)_4$, $CH_3SO_3Li$, $CF_3SO_3Li$, $LiN(CF_3SO_2)_2$, $LiC(CF_3SO_2)_3$, LiCl, and LiBr. These electrolyte salts may be used alone or in combination.

When the gel electrolyte or the polymer gel electrolyte is used as the nonaqueous electrolyte, poly(vinylidene fluoride), copolymers of vinylidene fluoride and hexafluoropropylene, polyamides, aromatic polyamides, polyolefins, polyesters, polycarbonates, polyimides, poly (met)acrylates, polyacrylonitrile, or the like may be used as the gelatinizer or as the polymer material for stabilizing the nonaqueous electrolyte.

It should be noted that although the present invention is described in terms of a cylindrical nonaqueous electrolyte secondary battery as shown in FIG. 1, the shape of the nonaqueous electrolyte secondary battery is not limited to this and may be square-shaped, laminate-shaped, card-shaped, etc.

EXAMPLES

The present invention is described below by way of examples. A plurality of lithium-ion secondary batteries were prepared as the examples and as the comparative examples of the nonaqueous electrolyte secondary batteries.

Experiment 1

In Experiment 1, liquid nonaqueous electrolytes containing various types of organic compounds were prepared to examine the differences in battery characteristics according to the types of the organic compounds added.

Example 1

Preparation of Negative Electrode

A graphitized-material powder was prepared as a negative electrode active material.

First, 30 parts by weight of a coal-tar-based pitch as a binder was added to 100 parts by weight of a coal-based coke as a filler. After mixing at a temperature of approximately 100° C., the mixture was press-formed using a press so as to make a precursor of a molded carbonaceous material. The resulting precursor was then thermally-treated at a temperature of 1,000° C. or less to form a molded carbonaceous material.

The molded carbonaceous material was impregnated with a melt of binder pitch at a temperature of 200° C. or less and was then thermally treated at a temperature of 1,000° C. or less. This pitch-impregnation/baking process is repeated several times. Subsequently, the molded carbonaceous material was thermally treated in an inert atmosphere at a temperature of 2,800° C. so as to form a molded graphitized material. The molded graphitized material was pulverized and classified to make a graphitized-material powder.

The graphitized-material powder was subjected to an X-ray diffraction analysis. The results showed that the interplanar distance of the (002) plane was 0.337 nm and the thickness of the c-axis crystallite calculated from the (002) diffraction lines was 50.0 nm. The true density obtained by using a pycnometer was 2.23 g/cm$^3$, and the bulk density obtained by a method described in JIS K-1469 was 0.83 g/cm$^3$. The average shape parameter $X_{ave}$ was 31.2 μm average diameter. The specific surface area measured by the Brunauer-Emmett-Teller method was 4.4 m$^2$/g. The average particle diameter in the particle size distribution determined by a laser diffraction method was 31.2 μm, the 10% cumulative grain diameter was 12.3 μm, the 50% cumulative grain diameter was 29.5 μm, the 90% cumulative grain diameter was 53.7 μm, and the mean value of the fracture strength of the graphite particles was 7.1 kgf/mm$^2$. The bulk density and the average shape parameter $X_{ave}$ were determined as follows.

Method for Determining Bulk Density

The bulk density was determined by the method described in JIS K-1469. To be specific, a sample powder of a molded-graphitized-material powder was gradually put into a measuring cylinder having a capacity of 100 g/cm$^3$. The mass of the cylinder had been determined in advance. The mass of the measuring cylinder and the sample powder was determined as a whole with an accuracy of 0.1 g and the mass of the measuring cylinder was subtracted therefrom so as to determine the mass (M) of the powder sample. The measuring cylinder containing the sample powder was corked and dropped 50 times onto a rubber plate from a height of 5 cm so as to compress the sample powder contained in the measuring cylinder. The volume (V) of the compressed sample powder was then determined. The bulk density (g/cm$^3$) is calculated according to the formula below.

$$D=M/V$$

D: bulk density (g/cm$^3$)
M: mass (g) of the sample powder in the measuring cylinder
V: volume (cm$^3$) of the sample powder in the measuring cylinder after dropping 50 times Average Shape Parameter $X_{ave}$ The average shape parameter $X_{ave}$, that is, the average of the shape parameter X, was obtained as follows. First, a sample powder of the graphite material was examined using a scanning electron microscope and ten particles having the length in the longitudinal axis of ±30% of the average grain diameter determined by using a grain size distribution measuring apparatus such as laser diffraction method were selected. The thickness (T) of the thickest portion, the length (L) in the longitudinal direction, and the length (W) in the direction orthogonal to the longitudinal direction were determined for each of the selected particles, the shape parameter X was calculated using the formula below, and the average value thereof was calculated to obtain the average shape parameter $X_{ave}$.

$$X=(W/T)\times(L/T)$$

X: shape parameter
T: the thickness of the thickest portion of the particle
L: the length in the longitudinal direction of the particle
W: the length in the direction orthogonal to the longitudinal direction of the particle.

Next, 90 parts by weight of a molded-graphitized-material powder as the negative electrode active material was mixed with 10 parts by weight of poly(vinylidene fluoride) as the binder to prepare a negative electrode mixture. The mixture was dispersed into N-methylpyrrolidone to make a negative electrode mixture slurry. The negative electrode mixture slurry was evenly applied onto both surfaces of a copper foil which is used as a negative electrode collector and has a thickness of 10 μm, was dried, was press-formed at a predetermined pressure, and was slit so as to form a sheet-shaped negative electrode.

Preparation of Positive Electrode

A mixture of lithium carbonate 0.5 molar and cobalt carbonate 1 molar was sintered in air at a temperature of 900° C. for five hours so as to synthesize $LiCoO_2$ to be used as a positive electrode active material. The resulting substance was subjected to an X-ray diffraction analysis and it was confirmed that the results coincided with the data of $LiCoO_2$ registered in JCPDS file. Then $LiCoO_2$ was pulverized to make a $LiCoO_2$ powder. The $LiCoO_2$ powder was also pulverized so that the 50% cumulative particle diameter thereof was 15 μm in the grain size distribution determined by a laser diffraction method.

95 parts by weight of $LiCoO_2$ powder and 5 parts by weight of lithium carbonate powder were mixed to make a mixture powder. 91 parts by weight of the mixture powder, 6 parts by weight of the graphite flakes as a conductant agent, and 3 parts by weight of poly(vinylidene fluoride) as a binder were mixed to prepare a positive electrode mixture. The positive electrode mixture was then dispersed into N-methylpyrrolidone to make a positive electrode mixture slurry. The positive electrode mixture slurry was evenly applied onto both surfaces of an aluminum foil which is used as a positive electrode collector and has a thickness of 20 μm, was dried, was press-formed at a predetermined pressure, and was slit so as to form a sheet-shaped positive electrode.

Preparation of Nonaqueous Electrolyte Liquid 2 percent by weight of thiophenol of Chemical Formula 1 was added as thiols to an equivolume solvent mixture of EC and DMC. Then $LiPF_6$ was dissolved at a proportion of 1.5 mol/l to prepare a nonaqueous electrolyte liquid.

Chemical Formula 1

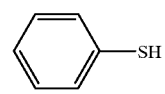

The negative electrode sheet and the positive electrode sheet formed as in the above were stacked with a separator composed of a microporous polypropylene film having a thickness of 25 μm therebetween in the order of the negative electrode, the separator, the positive electrode, and the separator. The stack was rolled a number of times so as to form spirally-wound electrodes having an outer diameter of 18 mm.

The spirally-wound electrodes were then inserted into an iron battery case plated with nickel. Insulation plates were provided on the top face and the bottom face of the spirally-wound electrodes. A nickel negative electrode lead was led out from the negative electrode collector and was welded to the battery case. The battery case connected with the negative electrode functions as an external negative electrode of the nonaqueous electrolyte secondary battery. An aluminum positive electrode lead was led out from the positive electrode collector and was welded to a battery lid with a current blocking plate for blocking electronic current in response to the battery-inner-voltage therebetween. The battery lid connected with the positive electrode functions as an external positive electrode of the nonaqueous electrolyte secondary battery.

After filling the battery case with the nonaqueous electrolyte liquid prepared as above, the battery lid was fixed by caulking the battery case through a sealing gasket on which asphalt is applied.

It is to be noted that in the nonaqueous electrolyte secondary battery, center pins for forming connections with the negative electrode lead and the positive electrode lead are provided. Moreover, a safety valve for releasing inner gas when the pressure inside the battery became higher than a preset value and a PTC element for preventing temperature elevation inside the battery were provided.

Thus, the cylindrical nonaqueous electrolyte secondary battery having a diameter of 18 mm and height of 65 mm was formed.

Example 2

A nonaqueous electrolyte secondary battery was prepared as in Example 1 except that a nonaqueous electrolyte liquid prepared by adding 2 percent by weight of 4-t-butyl-1,2,-benzenethiol shown in Chemical Formula 2 to an equivolume solvent mixture of EC and DMC as an aromatic thiol and dissolving $LiPf_6$ at a proportion of 1.5 mol/l was used.

Chemical Formula 2

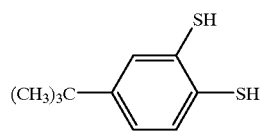

Example 3

A nonaqueous electrolyte secondary battery was prepared as in Example 1 except that a nonaqueous electrolyte liquid prepared by adding 2 percent by weight of 4-methylsulfonylacetophenone shown in Chemical Formula 3 to an equivolume solvent mixture of EC and DMC as an aromatic sulfone and dissolving $LiPf_6$ at a proportion of 1.5 mol/l was used.

Chemical Formula 3

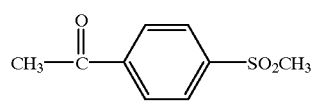

Example 4

A nonaqueous electrolyte secondary battery was prepared as in Example 1 except that a nonaqueous electrolyte liquid prepared by adding 2 percent by weight of ethyl difluoromethylthioacetate as a thioacetate to an equivolume solvent mixture of EC and DMC as an aromatic thiol and dissolving $LiPf_6$ at a proportion of 1.5 mol/l was used.

Example 5

A nonaqueous electrolyte secondary battery was prepared as in Example 1 except that a nonaqueous electrolyte liquid prepared by adding 2 percent by weight of phenyl thioacetate to an equivolume solvent mixture of EC and DMC as a thioacetate and dissolving $LiPf_6$ at a proportion of 1.5 mol/l was used.

Example 6

A nonaqueous electrolyte secondary battery was prepared as in Example 1 except that a nonaqueous electrolyte liquid prepared by adding 2 percent by weight of 2-methoxycarbonylthiophene shown in Chemical Formula 4 to an equivolume solvent mixture of EC and DMC as a thiophene and dissolving $LiPf_6$ at a proportion of 1.5 mol/l was used.

Chemical Formula 4

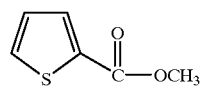

Example 7

A nonaqueous electrolyte secondary battery was prepared as in Example 1 except that a nonaqueous electrolyte liquid prepared by adding 2 percent by weight of 1,2-benzisothiazole shown in Chemical Formula 5 to an equivolume solvent mixture of EC and DMC as a thiazole and dissolving $LiPf_6$ at a proportion of 1.5 mol/l was used.

Chemical Formula 5

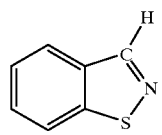

Example 8

A nonaqueous electrolyte secondary battery was prepared as in Example 1 except that a nonaqueous electrolyte liquid prepared by adding 2 percent by weight of 4-methylthioacetophenone shown in Chemical Formula 6 to an equivolume solvent mixture of EC and DMC as a thianisole and dissolving $LiPf_6$ at a proportion of 1.5 mol/l was used.

Chemical Formula 6

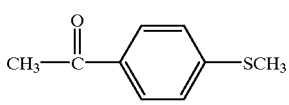

Comparative Example 1

A nonaqueous electrolyte secondary battery was prepared as in Example 1 except that a nonaqueous electrolyte liquid prepared by dissolving $LiPf_6$ at a proportion of 1.5 mol/l in an equivolume mixture solvent of EC and DMC without adding anything else was used.

Comparative Example 2

A nonaqueous electrolyte secondary battery was prepared as in Example 1 except that a nonaqueous electrolyte liquid prepared by adding 2 percent by weight of diethylsulfon to an equivolume solvent mixture of EC and DMC and dissolving $LiPf_6$ at a proportion of 1.5 mol/l was used.

Comparative Example 3

A nonaqueous electrolyte secondary battery was prepared as in Example 1 except that a nonaqueous electrolyte liquid prepared by adding 2 percent by weight of ethylmethylsulfon to an equivolume solvent mixture of EC and DMC and dissolving $LiPf_6$ at a proportion of 1.5 mol/l was used.

Comparative Example 4

A nonaqueous electrolyte secondary battery was prepared as in Example 1 except that a nonaqueous electrolyte liquid prepared by adding 2 percent by weight of ethylene glycol sulfite to an equivolume solvent mixture of EC and DMC and dissolving $LiPf_6$ at a proportion of 1.5 mol/l was used.

Comparative Example 5

A nonaqueous electrolyte secondary battery was prepared as in Example 1 except that a nonaqueous electrolyte liquid prepared by adding 2 percent by weight of methylphenylsulfite to an equivolume solvent mixture of EC and DMC and dissolving $LiPf_6$ at a proportion of 1.5 mol/l was used.

Comparative Example 6

A nonaqueous electrolyte secondary battery was prepared as in Example 1 except that a nonaqueous electrolyte liquid prepared by adding 2 percent by weight of 1,3-propanesultone to an equivolume solvent mixture of EC and DMC and dissolving $LiPf_6$ at a proportion of 1.5 mol/l was used.

Comparative Example 7

A nonaqueous electrolyte secondary battery was prepared as in Example 1 except that a nonaqueous electrolyte liquid prepared by adding 2 percent by weight of sulfolane to an equivolume solvent mixture of EC and DMC and dissolving $LiPf_6$ at a proportion of 1.5 mol/l was used.

Comparative Example 8

A nonaqueous electrolyte secondary battery was prepared as in Example 1 except that a nonaqueous electrolyte liquid prepared by adding 2 percent by weight of 3-methylsulfolane to an equivolume solvent mixture of EC and DMC and dissolving $LiPf_6$ at a proportion of 1.5 mol/l was used.

The thus prepared Examples 1 to 8 and Comparative Examples 1 to 8 of nonaqueous electrolyte secondary batteries were subjected to a constant-current charge at a charging voltage of 1.0 A to a limited voltage of 4.2 V. After reaching 4.2 V, a constant-voltage charge was performed. Subsequently, a constant-current discharge was performed at a discharging current of 1.0 A to a terminal voltage of 3.0 V in order to determine the initial capacity. Charge and discharge were repetitively performed under the above-described conditions and a discharge capacity after 200 cycles was measured so as to determine the rate of capacity retention, which is the ratio of the capacity after 200 cycles to the initial capacity.

The initial capacity and the rate of capacity retention of the batteries as well as the types of organic compounds added to the nonaqueous electrolytes are shown in Table 1.

TABLE 1

| | Organic Sulfur Compound | Content (wt. %) | Initial Capacity | Rate of Capacity retention (%) |
| --- | --- | --- | --- | --- |
| Example 1 | thiophenol | 2 | 1802 | 90 |
| Example 2 | 4-t-butyl-1,2-benzene-thiol | 2 | 1803 | 90 |
| Example 3 | 4-methylsulfonyl-acetophenone | 2 | 1800 | 90 |
| Example 4 | ethyl diofluoro-methylthioacetate | 2 | 1801 | 92 |
| Example 5 | phenyl thioacetate | 2 | 1804 | 91 |
| Example 6 | 2-methoxycarbonyl-thiophene | 2 | 1806 | 92 |
| Example 7 | 1,2-benzisothiazole | 2 | 1804 | 91 |
| Example 8 | 4-methylthio-acetophenone | 2 | 1802 | 90 |
| Comparative Example 1 | NONE | 0 | 1720 | 71 |
| Comparative Example 2 | diethylsulfon | 2 | 1733 | 74 |
| Comparative Example 3 | ethylmethylsulfon | 2 | 1732 | 74 |
| Comparative Example 4 | ethylene glycol sulfite | 2 | 1740 | 75 |
| Comparative Example 5 | methylphenylsulfite | 2 | 1738 | 74 |
| Comparative Example 6 | 1,3-propanesultone | 2 | 1748 | 76 |
| Comparative Example 7 | sulfolane | 2 | 1724 | 72 |
| Comparative Example 8 | 3-methylsulfolane | 2 | 1728 | 72 |

As is apparent from Table 1, Examples 1 to 8 of the nonaqueous electrolyte secondary batteries to which at least one of thiols, thiophenes, thioanisoles, thiazoles, thioacetates, aromatic sulfones, and their derivatives was added, had a high initial capacity exceeding 1,800 mAh and an improved rate of capacity retention of approximately 90%.

In contrast, Comparative Example 1 which does not include any of thiols, thiophenes, thioanisoles, thiazoles, thioacetates, aromatic sulfones, or their derivatives, had a low initial capacity and a poor rate of capacity retention.

Comparative Examples 2 to 8 of the nonaqueous electrolyte secondary batteries which contains sulfur but none of thiols, thiophenes, thioanisoles, thiazoles, thioacetates, aromatic sulfones, and their derivatives, had a low initial capacity of 1,740 mAh or less and a poor rate of capacity retention of less than 80%.

In view of the above results, by adding at least one of thiols, thiophenes, thioanisoles, thiazoles, thioacetates, aromatic sulfones, and their derivatives to the nonaqueous electrolyte secondary battery, the capacity of the nonaqueous electrolyte secondary battery is significantly improved during cycling, thereby achieving a longer cycle life.

Experiment 2

In Experiment 2, an amount of at least one of thiols, thiophenes, thioanisoles, thiazoles, thioacetates, aromatic sulfones, and their derivatives added to a nonaqueous electrolyte was varied to examine the differences in initial capacity and rate of capacity retention of the nonaqueous electrolyte secondary battery.

Example 9

A nonaqueous electrolyte secondary battery was prepared as in Example 6 except that the content of 2-methoxycarbonylthiophene was 0.03 percent by weight.

Example 10

A nonaqueous electrolyte secondary battery was prepared as in Example 6 except that the content of 2-methoxycarbonylthiophene was 0.05 percent by weight.

Example 11

A nonaqueous electrolyte secondary battery was prepared as in Example 6 except that the content of 2-methoxycarbonylthiophene was 10 percent by weight.

Example 12

A nonaqueous electrolyte secondary battery was prepared as in Example 6 except that the content of 2-methoxycarbonylthiophene was 12 percent by weight.

The initial capacities and the rates of capacity retention of the thus prepared Examples 9 to 12 of the nonaqueous electrolyte secondary batteries were determined by the same above-described method. The initial capacities and the rates of capacity retention are shown in Table 2 as well as the contents of the 2-methoxycarbonylthiophene.

TABLE 2

| | Organic Sulfur Compound | Content (wt. %) | Initial Capacity | Rate of Capacity retention (%) |
|---|---|---|---|---|
| Example 9 | 2-methoxycarbonyl-thiophene | 0.03 | 1745 | 75 |
| Example 10 | 2-methoxycarbonyl-thiophene | 0.05 | 1803 | 88 |
| Example 11 | 2-methoxycarbonyl-thiophene | 10 | 1802 | 89 |
| Example 12 | 2-methoxycarbonyl-thiophene | 12 | 1730 | 73 |

Comparing Examples 9 and 10, Example 10 containing 0.05 percent by weight of 2-methoxycarbonylthiophene had a higher initial capacity and a higher rate of capacity retention than did Example 9 containing less than 0.05 weight percent of the same. Comparing Examples 11 and 12, Example 11 containing 10 percent by weight of 2-methoxycarbonylthiophene had a higher initial capacity and a higher rate of capacity retention than did Example 12 containing more than 10 of the same.

Example 13

A nonaqueous electrolyte secondary battery using a nonaqueous electrolyte containing 4-methylthioacetophenone was prepared as in Example 3 except that 45 parts by weight of a molded-graphitized-material powder made as in Example 1, 45 parts by weight of $Mg_2Si$ which is an alloy compound capable of forming an alloy with lithium, and 10 parts by weight of poly(vinylidene fluoride) as a binder were mixed to make a negative electrode mixture.

Comparative Example 9

A nonaqueous electrolyte secondary battery using a nonaqueous electrolyte not containing even a trace of organic sulfur compound such as 4-methylthioacetophenone was prepared as in Comparative Example 1 except that a negative electrode mixture was prepared as in Example 13.

The initial capacity and the rates of capacity retention of the thus prepared Example 13 and the Comparative Example 9 of the nonaqueous electrolyte secondary batteries were determined by the same process as the above. The determined initial capacities and the rates of capacity retention are shown in Table 3.

TABLE 3

| | Organic Sulfur Compound | Content (wt. %) | Initial Capacity | Rate of Capacity retention (%) |
|---|---|---|---|---|
| Example 13 | 4-methylthio-acetophenone | 2 | 2100 | 70 |
| Comparative Example 9 | None | 0 | 2010 | 63 |

It is apparent from Table 3 that Example 13 of the nonaqueous electrolyte secondary battery containing an aromatic sulfone in the nonaqueous electrolyte liquid has a significantly high initial capacity and a superior rate of capacity retention.

It is apparent from the above results that by setting the content of thiophene in the range of 0.05 percent by weight to 10 percent by weight, the capacity of the nonaqueous electrolyte secondary battery after cycling is significantly improved, achieving a longer cycle life. The same effects can be achieved by setting the content of at least one of thiols, thioanisole, thiazole, thioacetates, aromatic sulfones, and the derivatives thereof in the range of 0.03 percent by weight to 10 percent by weight.

As described above, the nonaqueous electrolyte battery of the present invention comprising a nonaqueous electrolyte containing at least one of thiols, thiophenes, thioanisoles, thiazoles, thioacetates, aromatic sulfones, and the derivatives thereof has a longer cycle life since the capacity after cycling is significantly improved. The nonaqueous electrolyte secondary battery of the present invention contributes to significant improvements of the nonaqueous electrolyte secondary batteries.

What is claimed is:

1. A nonaqueous electrolyte secondary battery comprising a positive electrode having a positive electrode active material, a negative electrode containing a negative electrode active material capable of being doped/undoped with lithium nonaqueous electrolyte, a separator, and an exterior casing, wherein, the positive electrode comprises a positive electrode sheet comprising a positive electrode collector and positive electrode active material layers containing the positive electrode active material formed on both surfaces of the positive electrode collector, the negative electrode comprises a negative electrode sheet comprising a negative electrode collector and negative electrode active material layers containing the negative electrode active material formed on both surface of the negative electrode collector, the negative electrode active material comprises a graphite material with a true density of 2.1 $g/cm^3$ or more, a (002) interplanar distance of less than 0.340 nm, and an average value of the shape parameter X of 125 or less, the shape parameter X being equal to (W/T)×(L/T), W being the length of a parameter in a direction perpendicular to the longitudinal axis, T being the thickness of the thinnest portion of the particle, L being the length of the particle in the longitudinal direction, the positive electrode and the negative electrode are stacked with the separator there between and the resulting stack is rolled in a longitudinal direction to form spirally-wound electrodes, the spirally-wound electrodes are accommodated within the exterior casing; and the nonaqueous electrolyte contains a thioacetate in a range from 0.03 to 10 percent by weight of the electrolyte.

2. A nonaqueous electrolyte secondary battery according to claim 1, wherein the positive electrode active material comprises one of a lithium-containing metal oxide and an intercalation compound containing lithium.

3. A nonaqueous electrolyte secondary battery according to claim 2, wherein the positive electrode active material comprises a composite oxide of lithium and a transition metal represented by the general formula $LiM_xO_y$, wherein M is at least one selected from the group consisting of Co, Ni, Mn, Fe, Al, V, and Ti.

4. A nonaqueous electrolyte secondary battery according to claim 1, wherein the nonaqueous electrolyte is one selected from a liquid nonaqueous electrolyte prepared by dissolving an electrolyte salt into a nonaqueous solvent, a gelified electrolyte prepared by gelifying the nonaqueous electrolyte liquid by using a gelatinizer, a polymer gel electrolyte containing an electrolyte salt dissolved in a nonaqueous electrolyte which is held in a polymer matrix, and a solid electrolyte containing an electrolyte salt dissolved in a polymer matrix.

5. A nonaqueous electrolyte secondary battery according to claim 4, wherein the polymer matrix comprises one selected from the group consisting of poly(vinylidene fluoride), copolymers of vinylidene fluoride and hexafluoropropylene, polyamides, aromatic polyamides, polyolefins, polyesters, polycarbonates, polyimides, poly (met)acrylates, and polyacrylonitrile.

6. A nonaqueous electrolyte secondary battery according to claim 4, wherein the electrolyte salt comprises at least one lithium salt selected from the group consisting of $LiClO_4$, $LiAsF_6$, $LiPF_6$, $LiBF_4$, $LiB(C_6H_5)_4$, $CH_3SO_3Li$, $CF_3SO_3Li$, $LiN(CF_3SO_2)_2$, $LiC(CF_3SO_2)_3$, $LiCl$, and $LiBr$.

7. A nonaqueous electrolyte secondary battery according to claim 1, wherein the thioacetate is either methyl thioacetate or ethyl thioacetate or phenyl thioacetate or methyl fluoromethylthioacetate or methyl difluoromethylthioacetate or ethyl difluoromethylthioacetate or one of the derivatives thereof.

8. A nonaqueous electrolyte secondary battery according to claim 1, wherein the thioacetate is either methyl thioacetate or ethyl thioacetate or phenyl thioacetate or methyl fluoromethylthioacetate or methyl difluoromethylthioacetate or ethyl difluoromethylthioacetate.

* * * * *